United States Patent
Shen

(10) Patent No.: US 11,873,314 B2
(45) Date of Patent: Jan. 16, 2024

(54) COMPOSITION AND PREPARATION FOR HAFNIUM CARBIDE CERAMIC PRECURSOR

(71) Applicant: Starfire Systems, Inc., Glenville, NY (US)

(72) Inventor: Howard Q. Shen, Albany, NY (US)

(73) Assignee: STARFIRE SYSTEMS, INC., Glenville, NY (US)

( * ) Notice: Subject to any disclaimer, the term of this patent is extended or adjusted under 35 U.S.C. 154(b) by 0 days.

(21) Appl. No.: 17/514,163

(22) Filed: Oct. 29, 2021

(65) Prior Publication Data

US 2022/0135600 A1    May 5, 2022

Related U.S. Application Data

(60) Provisional application No. 63/107,615, filed on Oct. 30, 2020.

(51) Int. Cl.
| | | |
|---|---|---|
| C07F 7/00 | (2006.01) | |
| C04B 35/56 | (2006.01) | |
| C08G 79/00 | (2006.01) | |

(52) U.S. Cl.
CPC ............ *C07F 7/00* (2013.01); *C04B 35/5622* (2013.01); *C08G 79/00* (2013.01)

(58) Field of Classification Search
CPC .. C04B 35/515; C07F 7/00; C07F 7/28; C07F 9/00; B01J 2219/00824; B01J 20/0211; B01J 20/0214; B01J 20/226
See application file for complete search history.

(56) References Cited

U.S. PATENT DOCUMENTS

| | | | | |
|---|---|---|---|---|
| 4,945,072 A * | 7/1990 | Burns | ............... | C08G 79/00 501/96.2 |
| 5,204,431 A | 4/1993 | Sartori et al. | | |
| 5,783,139 A * | 7/1998 | Curran | ............... | C04B 35/571 419/10 |
| 6,025,442 A * | 2/2000 | Harris | ............... | A63B 37/0003 473/378 |
| 6,395,840 B1 | 5/2002 | Paul et al. | | |
| 6,495,483 B1 * | 12/2002 | Keller | ............... | C08G 77/56 501/96.2 |
| 2002/0098291 A1 * | 7/2002 | Paul | ............... | C08F 279/02 427/314 |
| 2003/0134736 A1 * | 7/2003 | Keller | ............... | C08G 77/58 501/88 |
| 2007/0178038 A1 | 8/2007 | Pope et al. | | |
| 2017/0088674 A1 | 3/2017 | Zhang et al. | | |
| 2020/0002236 A1 * | 1/2020 | Wee | ............... | H01B 1/20 |
| 2020/0392048 A1 * | 12/2020 | van Hassel | ....... | C04B 35/62227 |

FOREIGN PATENT DOCUMENTS

| | | | | | |
|---|---|---|---|---|---|
| CN | 102153760 A | * | 8/2011 | | |
| CN | 104016679 A | | 9/2014 | | |
| CN | 109054026 A | * | 12/2018 | ......... | C04B 35/5622 |
| CN | 109054026 A | | 12/2018 | | |
| CN | 111471268 A | | 7/2020 | | |
| CN | 109054026 B | | 2/2021 | | |

OTHER PUBLICATIONS

E. Negishi et al., 111 Journal of the American Chemical Society, 3336-3346 (1989) (Year: 1989).*
X. Long et al., 32 Applied Organometallic Chemistry (2018) (Year: 2018).*
J. Brecher, Graphical Representation Standards for Chemical Structure Diagrams (IUPAC Recommendations 2008), 80 Pure Appl. Chem. 277-410 (2008) (Year: 2008).*
E. Negishi et al., 111 Journal of the American Chemical Society, 3089-3091 (1989) (Year: 1989).*
J. Bercaw et al., 11 Organometallics, 639-645 (1992) (Year: 1992).*
K. Inzenhofer et al., 40 Dalton Transactions, 4741-4745 (2011) (Year: 2011).*
T. Takahashi et al., Chemistry Letters, 159-160 (1995) (Year: 1995).*
Inzenhofer et al. "The preparation of HfC/C ceramics via molecular design", The Royal Society of Chemistry, Dalton Trans., 2011, 40, pp. 4741-4745.
Ionescu et al. "Polymer-Derived Ultra-High Temperature Ceramics (UHTCs) and Related Materials", Advanced Engineering Materials, 2019, 21, 1900269, 24 pages.
Wilkinson et al. "Bis-cyclopentadienyl Compounds of Ti, Zr, V, Nb and Ta", J. Am. Chem. Soc. 1954, 76, 17, 4281-4284.
European Patent Office; International Search Report and Written Opinion for PCT application No. PCT/US2021/057213 dated Mar. 22, 2022, 14 pages.

* cited by examiner

*Primary Examiner* — Alexander R Pagano
(74) *Attorney, Agent, or Firm* — BURNS & LEVINSON LLP

(57) ABSTRACT

Metal containing polymer compositions, useful for the production of high temperature metal carbide ceramics are described, including poly(carbohafnocene) compositions and related poly(carbometallocene) compositions, as well as compositions formed from the reaction of hafnium chloride and 2-butyne-1,4-diol. Methods of synthesizing such compositions are provided.

12 Claims, No Drawings

COMPOSITION AND PREPARATION FOR HAFNIUM CARBIDE CERAMIC PRECURSOR

CROSS REFERENCE TO RELATED APPLICATIONS

The present application claims the benefit of U.S. Provisional Patent Application No. 63/107,615 filed Oct. 30, 2020, the disclosure of which is incorporated by reference herein in its entirety.

TECHNICAL FIELD

The present invention relates to compositions of and methods for synthesizing linear and branched polymers, including poly(carbometallocene) polymers and a hafnium containing 2-butyne-1,4-diol polymer, useful for the production of metal carbide ceramics, and more particularly to poly(carbohafnocene) polymers and hafnium containing 2-butyne-1,4-diol polymer configured for the synthesis of ultra-high temperature hafnium carbide (HfC) ceramics.

BACKGROUND ART

Hafnium carbide (HfC) has the highest melting point among ultra-high temperature ceramics (UHTCs), making it particularly useful for hypersonic vehicle parts. As Ionescu and colleagues have summarized in a recent review article, an attractive approach to HfC fabrication involves the high temperature conversion of polymeric HfC precursors. (E. Ionescu et al., *Polymer-Derived Ultra-High Temperature Ceramics (UHTCs) and Related Materials*, Adv. Eng. Mat., 21, 1900269 (2019)). However, the pre-ceramic polymers reported by Ionescu have too much free carbon or are insoluble in solvent or need lithium reagents for the synthesis. The patent application CN104016679A reported a water based HfC precursor using tartaric acid, oxalosuccinic acid, and citric acid. However, these polymers contain too much oxygen to be useful. For either approach, the resulting polymers have low ceramic yield, or poor processing ability or are simply too expensive.

SUMMARY OF THE EMBODIMENTS

In accordance with one embodiment of the invention, a ceramic precursor polymer composition is disclosed including at least one poly(carbometallocene) selected from:

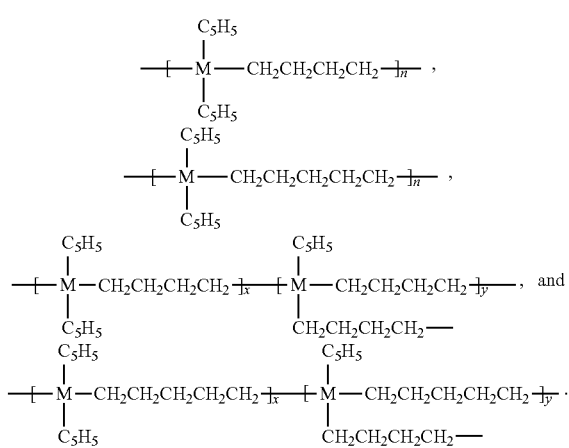

Here, $C_5H_5$ is a cyclopentadienyl ligand, n, x and y are integers greater than zero, and M is a metal. In preferred embodiments, M is a metal chosen from Hf, Zr, Ti, V, Nb, Ta, and combinations thereof.

In a preferred embodiment, the ceramic precursor composition includes:

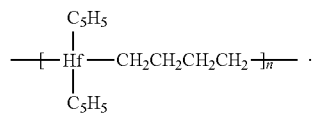

In a preferred embodiment, the ceramic precursor composition includes:

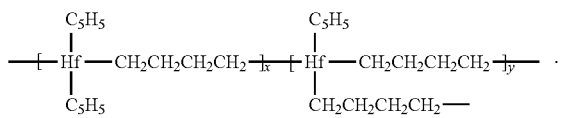

In some embodiments, the x/y ratio is greater than 2. In a preferred embodiment, the x/y ratio is between 2 and 10.

In a preferred embodiment, the ceramic precursor polymer composition is synthesized according to the reaction:

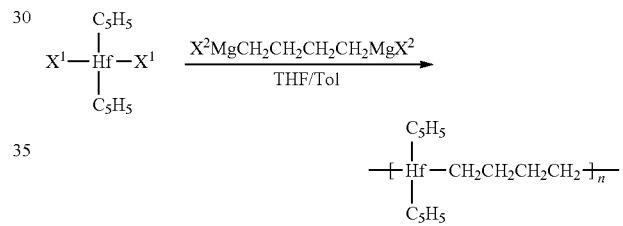

Here, $C_5H_5$ is a cyclopentadienyl ligand, $X^1$ and $X^2$ are halides, and n is an integer greater than zero. In a preferred embodiment, $X^1$ and $X^2$ are separately chosen from the group consisting of chloride and bromide. In a preferred embodiment, $X^1$ and $X^2$ are both chlorides.

In a preferred embodiment, the ceramic precursor polymer composition is synthesized according to the reaction:

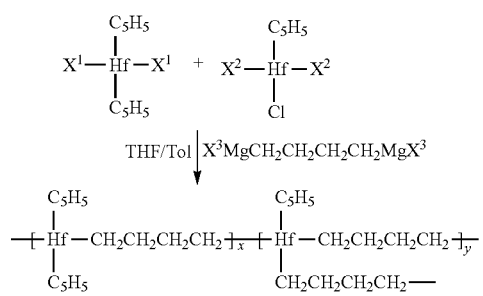

Here $C_5H_5$ is a cyclopentadienyl ligand, $X^1$, $X^2$, and $X^3$ are halides, separately chosen from the group consisting of chloride and bromide, and x and y are integers greater than zero.

In a preferred embodiment, a process for forming poly(carbohafnocene) polymers includes providing a bis(cyclopentadienyl)hafnium dihalide, and reacting the bis(cyclopentadienyl)hafnium dihalide with a di-Grignard reagent of formula $XMg(CH_2)_jMgX$, where X is a halide, and j is 4 or 5. In another preferred embodiment, the process further includes providing a mono(cyclopentadienyl) hafnium trihalide, and reacting further includes reacting a mixture of the bis(cyclopentadienyl)hafnium dihalide, and the mono(cyclopentadienyl)hafnium trihalide, with the di-Grignard reagent of formula $XMg(CH_2)_jMgX$. In a preferred embodiment of the process, the ratio of bis(cyclopentadienyl) hafnium dihalide to mono(cyclopentadienyl)hafnium trihalide is between 2 and 10.

In a preferred embodiment, a hafnium carbide ceramic is obtained by heating a ceramic precursor polymer composition as described above to a temperature between about 850° C. to about 950° C. under an inert gas atmosphere. In preferred embodiments, the ceramic precursor polymer includes

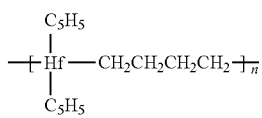

In another preferred embodiment, the ceramic precursor polymer includes

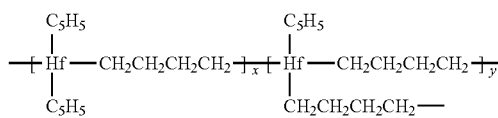

In a preferred embodiment, the x/y ratio is between 2 and 10.

In some embodiments, a ceramic precursor polymer composition includes:

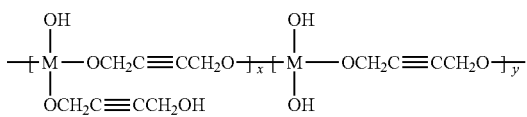

wherein M is a metal selected from the group consisting of Hf, Zr, Ti, V, Nb, Ta, W, and combinations thereof, and wherein x and y are integers greater than zero.

In a preferred embodiment, the metal in the ceramic precursor polymer composition is hafnium, and the ceramic precursor polymer includes:

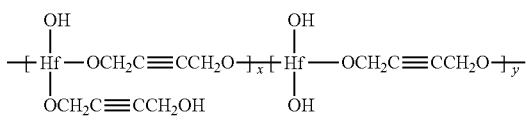

wherein x and y are integers greater than zero.

In some embodiments, the ratio of x/y in the ceramic precursor polymer is between 5:1 and 1:5. In a preferred embodiment, the ratio of x/y is between 2:1 and 1:2.

In some embodiments, the ceramic precursor polymer is synthesized from hafnium chloride and 2-butyne-1,4-diol according to the following reaction:

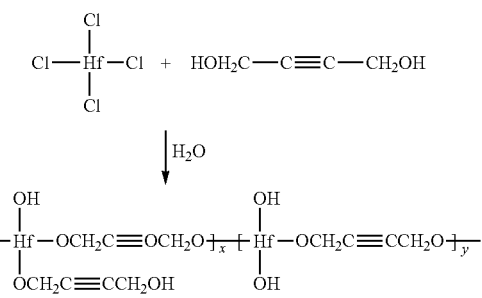

In an embodiment, a hafnium oxycarbide ceramic is obtained by heating the ceramic precursor polymer to temperatures from about 850° C. to about 1000° C. under an inert gas atmosphere.

In an embodiment, a hafnium carbide ceramic is obtained by heating the ceramic precursor polymer to temperatures from about 1000° C. to about 1600° C. under an inert atmosphere.

DETAILED DESCRIPTION OF SPECIFIC EMBODIMENTS

Definitions

As used in this description and the accompanying claims, the following terms shall have the meanings indicated, unless the context otherwise requires:

A "cyclopentadienyl" ligand, herein represented by $C_5H_5$, or alternatively Cp, is a planar pentagonal, singly negatively charged aromatic moiety that can coordinate as a ligand to metal atoms by means of overlapping metal d-orbitals and the cyclopentadienyl π electrons.

A "metallocene" is a metal coordination complex consisting of two cyclopentadienyl anions bound to and "sandwiching" a metal center.

A "hafnocene" is a metallocene wherein the metal coordinating the two cyclopentadienyl anions is hafnium.

A "poly(carbometallocene)" polymer is a polymer with a metallocene group incorporated into the backbone.

A "poly(carbohafnocene)" polymer is a polymer with a hafnocene group incorporated into the backbone.

Compositions.

Embodiments of the present invention include compositions of metal containing polymers useful as precursors for the production of high temperature ceramics. In some embodiments, these metal containing polymers are poly (carbometallocene) polymers. In some embodiments these poly(carbometallocene) polymers have linear structures:

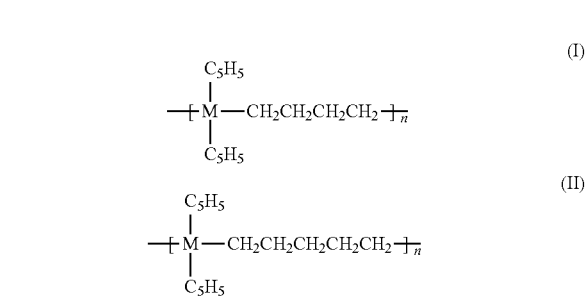

Here, $C_5H_5$ is a cyclopentadienyl ligand, n is an integer greater than zero, and M is a metal selected from the group consisting of Hf, Zr, Ti, V, Nb, Ta, and combinations thereof. In preferred embodiments, the metal is selected from the group consisting of Hf, Zr, Ti, and combinations thereof.

In preferred embodiments, the metal is hafnium:

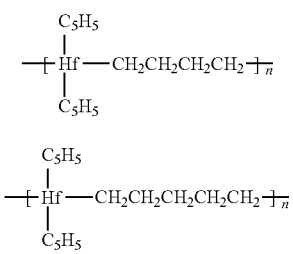

In a preferred embodiment, the hydrocarbon chains are butyl groups (structure I). In a preferred embodiment, the metal is hafnium and the hydrocarbon groups are butyl groups (structure III).

In some embodiments, the poly(carbometallocene) polymers have branched structures, and can be drawn as follows:

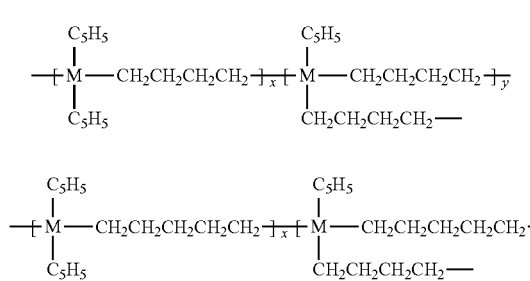

In these structures, $C_5H_5$ is a cyclopentadienyl ligand, x and y are integers greater than zero, and M is a metal selected from the group consisting of Hf, Zr, Ti, V, Nb, Ta, and combinations thereof. In preferred embodiments, the metal is selected from the group consisting of Hf, Zr, Ti, and combinations thereof. The monomer enclosed in the x bracket provides a linear poly(carbometallocene) along the polymer backbone, and the monomer enclosed in the y bracket is a branched structure with repeating poly(carbometallocene) groups extending along the backbone, and branching off of the polymer backbone. In these structures, the x and y indices refer solely to the number of unbranched and branched monomers, respectively, and provide no indication of the distribution of monomers along the backbone, thereby encompassing both random and block copolymers.

In a preferred embodiment, the metal is hafnium:

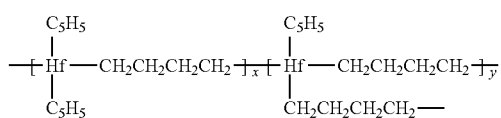

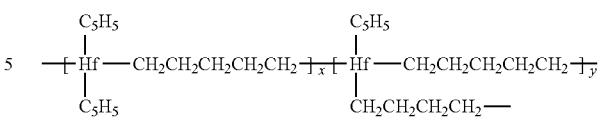

In preferred embodiments, the hydrocarbon chains are butyl groups (structure V). In preferred embodiments, the metal is hafnium and the hydrocarbon groups are butyl groups (structure VII). In a preferred embodiment, the x/y ratio is between 2 and 20.

In an embodiment, a metal carbide ceramic is obtained by heating a poly(carbometallocene) polymer with any of structures (I) through (VII) under an inert gas atmosphere. In an embodiment, the inert gas is argon. In a preferred embodiment, the metal carbide ceramic is a hafnium carbide ceramic, formed by heating a poly(carbohafnocene) polymer chosen from the group consisting of polymers (III), (IV), (VII), and (VIII) to a temperature between about 850° C. to about 950° C. under an inert gas atmosphere.

In some embodiments the metal containing polymer compositions useful as precursors for the production of high temperature ceramics include oxygen containing hafnium polymers that can be used to form hafnium carbide with a 1:1 stoichiometric ratio of hafnium and carbon by means of a process of carbothermal reduction. A preferred polymer composition for such carbothermoreduction is:

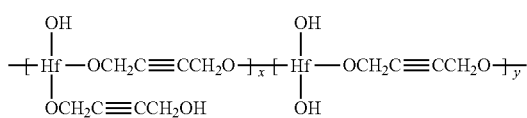

In this composition the ratio of x to y can be varied between 5:1 and 1:5, with a preferred ratio of between 2:1 and 1:2, and a particularly preferred ratio of 1:1.

Following thermal curing at temperatures below 200° C., leading to the polymerization of the carbon-carbon triple bonds, hafnium oxycarbide can be formed at a yield of about 80% at temperatures from about 850° C. to about 1000° C. under argon. At temperatures between 1000° C. to 1600° C. under argon, excess carbon and oxygen can be removed by carbothermal reduction to form HfC at a stoichiometry of 1:1 Hf to C.

Synthetic Methods.

In preferred embodiments, linear poly(carbohafnocene) polymers are synthesized by the reaction of bis(cyclopentadienyl) hafnium dihalides ($Cp_2HfX_2$) with di-Grignard reagents $XMg(CH_2)_j MgX$, where j is an integer equal to 4 or 5. In a preferred embodiment, a poly(carbohafnocene) polymer with butyl groups along the main chain can be synthesized in an aprotic solvent according to equation (1):

equation (1)

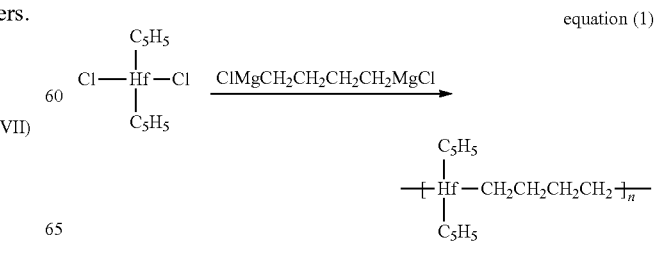

In a preferred embodiment, the reaction is performed by mixing ClMgCH$_2$CH$_2$CH$_2$CH$_2$MgCl in tetrahydrofuran (THF) with bis(cyclopentadienyl) hafnium dichloride (Cp$_2$HfCl$_2$) in toluene.

In another embodiment, a poly(carbohafnocene) polymer with pentyl groups along the backbone is synthesized by the reaction of ClMgCH$_2$CH$_2$CH$_2$CH$_2$CH$_2$MgCl with Cp$_2$HfCl$_2$.

In preferred embodiments, branched poly(carbohafnocene) polymers are synthesized by the reaction of a mixture of bis(cyclopentadienyl) hafnium dihalides (Cp$_2$HfX$_2$) and mono(cyclopentadienyl) hafnium trihalides with di-Grignard reagents XMg(CH$_2$)$_j$MgX, where j is an integer equal to 4 or 5. In a preferred embodiment, a poly(carbohafnocene) polymer with butyl groups along the main and side chains can be synthesized in an aprotic solvent according to equation (2):

equation (2)

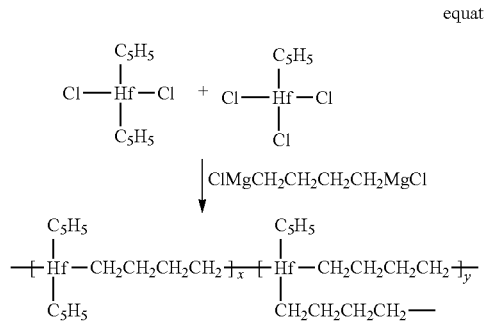

In a preferred embodiment, the reaction is performed by mixing ClMgCH$_2$CH$_2$CH$_2$CH$_2$MgCl in tetrahydrofuran (THF) with bis(cyclopentadienyl) hafnium dichloride (Cp$_2$HfCl$_2$) and mono(cyclopentadienyl) hafnium trichloride (CpHfCl$_3$) in toluene.

In another embodiment, a poly(carbohafnocene) polymer with pentyl groups along the backbone and sidechains is synthesized by the reaction of Cp$_2$HfCl$_2$ and CpHfCl$_3$ with ClMgCH$_2$CH$_2$CH$_2$CH$_2$CH$_2$MgCl.

In some embodiments, a polymer formed by either of equations (1) and (2) is heated to a temperature between about 850° C. to about 950° C. under an inert gas atmosphere to form a hafnium carbide ceramic.

In some embodiments, oxygen-containing hafnium polymers suitable for forming HfC in a 1:1 stoichiometry of hafnium to carbon are synthesized from hafnium chloride and 2-butyne-1,4-diol according to the reaction:

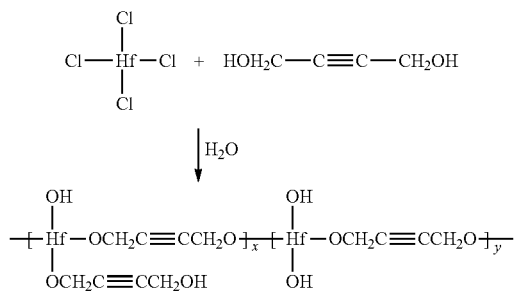

In some embodiments this precursor is thermally cured at temperatures below 200° C. through the polymerization of the carbon-carbon triple bonds. In some embodiments the thermally cured precursor is heated under argon at temperatures from about 350° C. to about 1000° C. to form hafnium oxycarbide. In some embodiments the thermally cured precursor is heated to temperatures between 1000° C. and 1600° C., thereby removing excess carbon and oxygen by carbothermal reduction to form HfC at a stoichiometry of 1:1 Hf to C.

EXAMPLES

Example 1

To a 500 mL three-necked round bottom flask equipped with a water condenser, a thermometer, and a dropping funnel, 15.19 g (0.04 mols) of bis(cyclopentadienyl)hafnium dichloride was mixed with 80 g of toluene. The flask was kept under nitrogen atmosphere to prevent moisture contamination and cooled externally by an ice/salt/water bath. Magnetic stirring was used to agitate the solution. Once the temperature of the solution fell below 0° C., 0.04 mols of ClMgCH$_2$CH$_2$CH$_2$CH$_2$MgCl di-Grignard reagent in 30 mL of THF was added through the dropping funnel. The temperature of the reaction was maintained below 0° C. during the addition of the di-Grignard reagent. The di-Grignard reagent was slowly added over a period of about 30 min. Following the addition of the di-Grignard reagent, the reaction mixture was kept in the cooling bath for 2 hours, then removed from the cooling bath and stirred at room temperature overnight. A brown solution with some solid precipitation was obtained. The liquid was filtered off under nitrogen, and the solid was washed with 20 ml of toluene. The washing toluene was also filtered and combined with the first filtration liquid. The combined solution was then distilled under reduced pressure to remove the used THF and toluene solvent. 13.3 g (91% of theoretical yield) of brown solid, corresponding to the homo-polymer (III) was obtained. Thermogravimetric Analysis (TGA) of the obtained solid under argon to 900° C. provided a black ceramic residue with 69% yield.

Example 2

To a 500 mL three-necked round bottom flask equipped with a water condenser, a thermometer, and a dropping funnel, 15.19 g (0.04 mols) of bis(cyclopentadienyl)hafnium dichloride and 3.5 g (0.01 mol) of (cyclopentadienyl)hafnium trichloride were mixed with 100 g of toluene. The flask was kept under nitrogen atmosphere to prevent moisture contamination and cooled externally by an ice/salt/water bath. Magnetic stirring was used to agitate the solution. Once the temperature of the solution fell below 0° C., 0.055 mols of ClMgCH$_2$CH$_2$CH$_2$CH$_2$MgCl di-Grignard reagent in 40 ml of THF was added through the dropping funnel. The temperature of the reaction was maintained below 0° C. during the addition of the di-Grignard reagent. The di-Grignard reagent was added slowly over a period of about 30 min. Following addition of the di-Grignard reagent, the reaction mixture was kept in the cooling bath for 2 hours, then removed from the cooling bath and stirred at room temperature overnight. A brown solution with some solid precipitation was obtained. The liquid was filtered off under nitrogen, and the solid was washed with 25 ml of toluene. The washing toluene was also filtered and combined with the first filtration liquid. The combined solution was then distilled under reduced pressure to remove the used THF and toluene solvent, 16.5 g (90% of theoretic yield) of dark brown solid, corresponding to the co-polymer (VII) was obtained. TGA of the obtained solid under argon to 900° C. provided a black ceramic residue with 65% yield.

Example 3

To a 250 mL three-necked round bottom flask equipped with a water condenser and a thermometer, 70 grams of distilled water were added. The flask was stirred magnetically and cooled with ice/water externally, then 30 grams of hafnium chloride were added in several portions. After cooling down to room temperature, 12.1 grams of 2-butyne-1,4-diol were added. At this point, the solution is saturated with two components without precipitation. This solution was then transferred to a 250 ml beaker and heated to 150-200° C. on a hot plate. Water and HCl were evolved from the solution during the heating. The solution turned into brown color and viscosity gradually went up. Condensation of hydroxyl groups and partial polymerization of carbon-carbon triple bonds occurred during the heating. After all water was evaporated, 29 grams of dense solid with dark brown color were obtained. TGA of the obtained solid under argon to 900° C. provided a black ceramic residue with 80% yield. Further heating to 1600° C. yielded a stoichiometric HfC.

The embodiments of the invention described above are intended to be merely exemplary; numerous variations and modifications will be apparent to those skilled in the art. All such variations and modifications are intended to be within the scope of the present invention as defined in the appended claims.

What is claimed is:

1. A ceramic precursor polymer composition comprising at least one poly(carbometallocene) selected from the group consisting of:

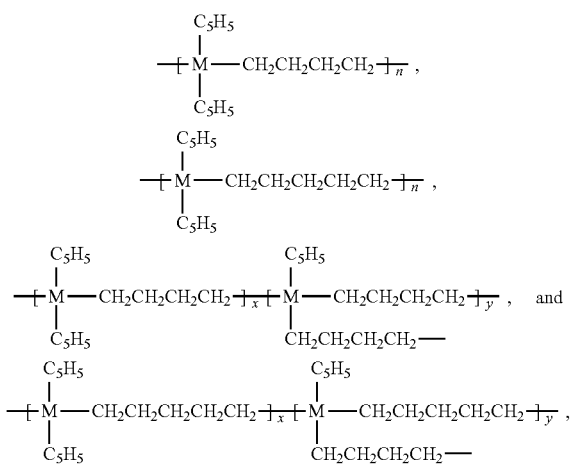

wherein $C_5H_5$ is a cyclopentadienyl ligand, n, x and y are integers representing degrees of polymerization of the at least one poly(carbometallocene), and M is a metal selected from the group consisting of Hf, Zr, Ti, V, Nb, Ta, and combinations thereof.

2. The ceramic precursor polymer composition of claim 1 wherein M is Hf.

3. The ceramic precursor polymer composition of claim 2 wherein the composition comprises:

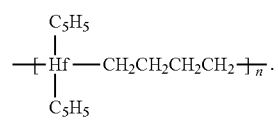

4. The ceramic precursor polymer composition of claim 2, wherein the composition comprises:

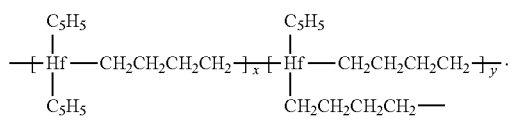

5. The ceramic precursor polymer composition of claim 4, wherein the x/y ratio is between 2 and 10.

6. The ceramic precursor polymer composition of claim 3 synthesized by means of a Grignard coupling reaction according to the reaction:

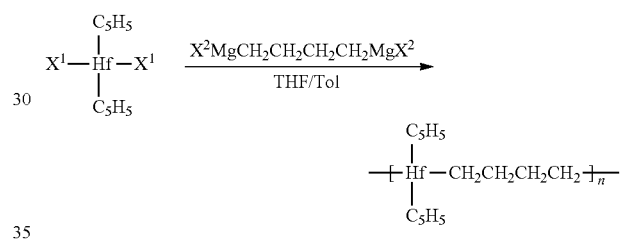

wherein $C_5H_5$ is a cyclopentadienyl ligand, $X^1$ and $X^2$ are halides.

7. The ceramic precursor polymer composition of claim 6, wherein $X^1$ and $X^2$ are separately chosen from the group consisting of chloride and bromide.

8. The ceramic precursor polymer composition of claim 6, wherein $X^1$ and $X^2$ are both chlorides.

9. The ceramic precursor polymer composition of claim 4 synthesized by means of a Grignard coupling reaction of a bis(cyclopentadienyl)hafnium dihalide and a mono(cyclopentadienyl)hafnium trihalide according to the equation:

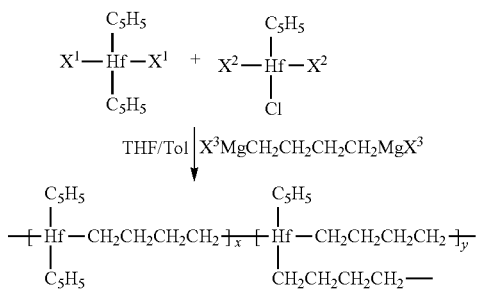

wherein $C_5H_5$ a cyclopentadienyl ligand, $X^1$, $X^2$, and $X^3$ are halides, separately chosen from the group consisting of chloride and bromide.

10. A process for forming the poly(carbohafnocene) polymer of claim 1 comprising: providing a bis(cyclopentadienyl)hafnium dihalide; and reacting the bis(cyclopentadienyl)hafnium dihalide with a di-Grignard reagent of formula $XMg(CH_2)_jMgX$, where X is a halide, and j is 4 or 5, thereby forming the poly(carbohafnocene) polymer of claim 1.

11. The process for forming poly(carbohafnocene) polymers according to claim 10, further comprising: providing a mono(cyclopentadienyl) hafnium trihalide, wherein reacting further includes reacting a mixture of the bis(cyclopentadienyl)hafnium dihalide, and a mono(cyclopentadienyl)hafnium trihalide, with the di-Grignard reagent of formula $XMg(CH_2)_jMgX$.

12. The process for forming poly(carbohafnocene) polymers according to claim 11 wherein the ratio of bis(cyclopentadienyl)hafnium dihalide to mono(cyclopentadienyl) hafnium trihalide is between 2 and 10.

\* \* \* \* \*